United States Patent Office 3,769,259
Patented Oct. 30, 1973

3,769,259
POLYMERS CONTAINING DIAZEPINONE AS AN ULTRAVIOLET STABILIZER
Alexander Michael Chalmers, Cheadle, England, assignor to Ciba-Geigy Corporation, Ardsley, N.Y.
No Drawing. Filed Jan. 17, 1972, Ser. No. 218,518
Claims priority, application Great Britain, Jan. 26, 1971, 3,160/71
Int. Cl. C08f 45/60
U.S. Cl. 260—45.8 N       4 Claims

ABSTRACT OF THE DISCLOSURE

Disclosed are stabilizing compositions comprising diazepinone. The new compositions possess good light stability.

---

The present invention relates to compositions comprising organic material susceptible to degradation by exposure to light stabilised by the presence of 5H-1,4-diazepin-5-one.

According to the present invention there is provided a composition comprising polymeric material and a minor proportion of the compound having the formula:

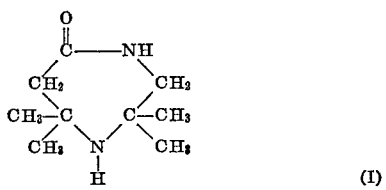

(I)

The compound of the Formula I is not novel. It is described by S. C. Dickerman and H. G. Lindwall in J. Org. Chem. 14, 530 (1949); The possibility of employing the compound as stabiliser for organic material against irradiation by light was not envisaged in these references.

Unexpectedly, we have now found that organic material containing the compound of Formula I as stabiliser is much more resistant to degradation by light than the same material containing a known light stabiliser. Moreover, the compound of Formula I has been found to possess heat stability, low volatility and good compatibility with substrates, particularly polyolefines.

The compound of the Formula I may be prepared either by reaction of 2,2,6,6-tetramethyl-4-piperidone with sodium azide in sulphuric acid or by heating the oxime in excess polyphosphoric acid or other catalyst suitable for use in Beckmann rearrangements for instance benzene sulphonyl chloride or p-toluene sulphonyl chloride.

The present invention also provides a method by which deterioration of polymeric material is inhibited, comprising incorporating into the polymeric material a minor proportion of the compound of Formula I.

The compound of Formula I has been found to impart to polyolefines an exceptionally high degree of stability against deterioration normally induced by the effects of ultra violet radiation. Moreover, this stability to light is achieved without affecting the colour properties of the polyolefine so treated. The compound of Formula I provide effective light stabilisation especially for low- and high-density polyethylene and polypropylene, polystyrene, and also for polymers of butene-1, pentene-1, 3-methylbutene-1, hexene-1, 4-methylpentene-1, 4-methylhexene-1, 4,4-dimethylpentene-1, as well as co- and ter-polymers of olefines, particularly of ethylene or propylene.

Other polymeric materials susceptible to degradation by the effects of light and the properties of which are improved by the incorporation therein of the compound of Formula I, include natural, and synthetic polymeric materials, such as natural and synthetic rubber, polymer blends or graft copolymers, for instance, homo-, co- and ter-polymers of acrylonitrile, butadiene and styrene.

Specific synthetic polymers include polyvinyl chloride, vinyl chloride co-polymers, and polyvinyl acetate as well as condensation polymers derived from ether, ester (ex carboxylic, sulphonic or carbonic acids), amide or urethane groupings. These polymers can, for instance, form the basis of surface coating media such as paints and lacquers having an oil or resin base, for instance an alkyd or polyamide resin base.

The amount of the compound of Formula I which is incorporated into the polymeric material in order to achieve maximal protection against degradation by light varies according to the properties of the polymeric material treated and according to the severity of the light radiation and to the length of exposure. However, for most purposes it is sufficient to use an amount of the compound of Formula I within the range of from 0.01% to 5% by weight, more preferably a proportion within the range of from 0.1% to 2% by weight based on the weight of untreated polymeric material.

Optionally, the composition of the invention may contain further additives, such as antioxidants, further light stabilisers, metal complexants/deactivators, pigments, antiblocking and antistatic agents, fillers, dyes and glass or other fibres.

The compound of Formula I may be incorporated into the polymeric material by any of the known techniques for compounding additives with a polymer. For example, the compound of Formula I and the polymer may be compounded in an internal mixer. Alternatively, the compound of Formula I may be added as a solution or slurry in a suitable solvent or dispersant, for instance an inert organic solvent such as methanol, ethanol or acetone to powdered polymer and the whole mixed intimately, the solvent being subsequently removed. As a further alternative, the compound of Formula I may be added to the polymer during the preparation of the latter, for instance at a later stage of polymer production, to provide prestabilised polymer material.

Examples of suitable antioxidants are those of the hindered phenol type such as 2,6-di-tertiarybutyl-p-cresol, 4,4' - bis (2,6 - di-tertiarybutyl-phenyl), 4,4'-bis (2,6-di-isopropylphenol), 2,4,6-triisopropyl phenol, 2,2'-thiobis-(4 - methyl - 6-tertiary-butylphenol) and tetrakis [methylene - 3 - (3',5' - dibutyl-4'-hydroxy-phenyl) propionate] methane; n-octadecyl-β-(4' - hydroxy-3',5'-t-butylphenyl) propionate esters of thio-dipropionic acid, for example dilauryl thiodipropionate; alkyl, aryl or aralkyl phosphites such as triphenyl phosphite, trinonyl phosphite and diphenyldecyl phosphite, and combinations of these antioxidants.

Further light stabilisers include those of the substituted benzotriazole class such as 2-(2'-hydroxy-5'-methylphenyl) benzotriazole and 2-(2'-hydroxy-3',5'-di-t-butylphenyl)-5-chloro-benzotriazole; those of the hydroxy benzophenone type; hindered phenols such as 2',4'-di-t-butylphenyl-3,5-di-t-butyl-4-hydroxy benzoate and the stabilisers described in our copending British patent application No. 18,090/70 and 28,063/70; and suitable metal complexants/deactivators include salicylidene-propylene diamine, 5,5'-methylene-bis-benzotriazole and salts of salicylaminoguanidine and nickel compounds, for example nickel complexes of 2,2'-thiobis-(4-tertiary octylphenol), such as the 1:1- and 1:2-complex, optionally with other ligands such as n-butylamine, nickel complexes of bis-(4-tertiary octylphenyl)-sulphone such as the 2:1-complex, optionally with other ligands such as 2-ethyl caproic, nickel dibutyl dithiocarbamate, nickel salts of 4-hdyroxy-3,5-di-tertiary butylbenzyl phosphonic acid mono alkyl esters, such as the methyl-, ethyl- or butyl esters, the nickel complex of 2-hydroxy-4-methyl-phenyl-undecyl ketone oxime.

As with the compound of Formula I, any further additive is advantageously employed in a proportion within the range of from 0.01% to 5% by weight based on the weight of untreated organic material.

In combination with an antioxidant suitable for use in inhibiting oxidative deterioration of polyolefines, for instance those of the hindered phenol type, the compound of Formula I provide extremely effective all round stabilising packages for polyolefines, especially polypropylene.

Some examples will now be given. Parts and percentages shown therein are by weight unless otherwise stated.

EXAMPLE 1

(a) A solution of 1.73 parts of 2,2,6,6-tetramethyl-4-piperidine monohydrate in 10 parts of chloroform was dried over potassium carbonate, filtered and cooled in an ice bath. To this cold, vigorously stirred solution there was added dropwise 8 parts of concentrated sulphuric acid. 1.62 parts of sodium azide was then added in small portions, over a period of 30 minutes. Stirring was continued for another 15 minutes, followed by dilution with 45 parts of ice and water. The solution was saturated with solid potassium carbonate and extracted thoroughly with ether. The ethereal solution was dried, filtered and evaporated under reduced pressure to dryness. 1.52 parts of an almost white product were obtained having a melting point of 140–145° C. Recrystallisation from dry benzene gave 2,2,7,7-tetramethylhexahydro-5$\underline{H}$-1,4-diazepine-5-one as colourless crystals having a melting point of 147.5° C. to 148° C.

(b) A 0.15% weight/volume solution of the product of Example 1(a) in acetone was made up and 40 parts by volume of this solution were added to 40 parts by weight of a powdered polypropylene which was substantially free from stabilising additives. A further 60 parts by volume of acetone was then added to form a slurry which was hand mixed to ensure homogeneity. The solvent was then removed by evaporation in a rotary evaporator heated by a boiling water bath, the last traces of solvent being removed by passing a slow stream of nitrogen through the evaporator, to leave a dry powder.

14 grams by weight of the dried powder were weighed into a mould measuring 6 x 6 x 0.015 inch. The mould and the polishing plate were then heated up to 180° C. in a press under contact pressure during 5 minutes. A pressure of 20 tons per square inch was applied for 1 minute, cooling was commenced and pressure increased so that when the temperature reached 150° C., the pressure was 80 tons per square inch. Cooling was continued until the temperature of the mould reached 50° C. and the mould was released from the press.

The samples of moulded sheet so obtained were exposed to light irradiation in a device consisting of a circular bank of 28 alternate sunlight and blacklight lamps. The sunlight lamps were 2 foot long 20 watt fluorescent lamps having a peak emission of 3100 Angstrom units and the black-light lamps were 2 foot long 40 watt ultra violet lamps having a peak emission of 3500 Angstrom units. The samples were rotated concentrically within the bank of lamps so that the radiation was uniformly distributed over them.

The exposed sample was examined periodically and bent through 180° C. and the time at which it snapped due to embrittlement was noted.

Similar tests were carried out on polypropylene samples containing respectively no stabiliser and 2-(2'-hydroxy-3',5'-di-t-butyl phenyl)-5-chlorobenzotriazole. The results achieved are set out in the following table.

| Additive: | Time to embrittlement (hours) |
|---|---|
| None | 82 |
| 2-(2' - hydroxy-3',5'-di-t-butylphenyl)-5-chlorobenzotriazole | 228 |
| Example 1.—2,2,7,7 - tetramethylhexahydro-5$\underline{H}$-1,4-diazepine-5-one | 353 |

EXAMPLE 2

(a) A mixture of 34.6 parts of triacetonamide hydrate and 13.9 parts of hydroxylamine hydrochloride in 400 parts of ethanol containing 5% by weight of water was heated under reflux conditions for 18 hours. On cooling, a precipitate formed and this was collected together with a further precipitate obtained by careful evaporation of the filtrate. The combined yield of the triacetonamine oxime hydrochloric precipitate was 35.2 parts. Basification of the precipitate with sodium carbonate solution, followed by ether extraction of the alkaline mixture gave 20.2 parts of triacetonamine oxime.

(b) 20 parts of triacetonamine oxime prepared as described in Example 2(a) were added to 600 parts of warm, mechanically stirred polyphosphoric acid. The mixture was heated at 115° C. for 15 minutes and then 2,000 parts of water were added and this solution basified with solid sodium carbonate. Continuous extraction of the alkaline solution with chloroform gave 12 parts of 2,2,7,7-tetramethyl-hexahydro-5$\underline{H}$-1,4-diazepine-5-one. Recrystallisation from dry benzene gave 11.1 parts of almost colourless crystals having melting point of 145° to 147° C.

(c) When incorporated into polypropylene the product of Example 2(b) showed excellent light stabilising properties.

EXAMPLE 3

(a) 10.1 parts of triacetoneamine oxime prepared as in Example 2(a) were dissolved in a mixture of 200 parts of acetone and 50 parts of water and the mixture was treated firstly with 8.5 parts of sodium hydroxide and then with 11.7 parts of p-toluene sulphonyl chloride. The mixture was then heated under reflux conditions for 18 hours. On cooling, the acetone was removed by evaporation and the aqueous solution was washed with 30 parts of chloroform. Evaporation of the chloroform solvent under reduced pressure gave a solid which was thoroughly extracted with 60 parts of hot chloroform. Evaporation of the chloroform solvent gave 4.1 parts of a colourless solid, 2,2,7,7 - tetramethylhexahydro-5$\underline{H}$-1,4-diazepine-5-one having a melting point of 145° to 147° C.

(b) When incorporated into polypropylene, the product of Example 3(a) showed very good light stabilising properties.

EXAMPLE 4

38 parts of polypropylene were homogenised with 0.076 parts of n-octadecyl-β-(4'-hydroxy-3',5'-di-t-butylphenyl) propionate in a kneading machine over a period of 3 minutes. 0.19 parts of 2,2,7,7-tetramethylhexahydro-5$\underline{H}$-1,4-diazepine-5-one was then added and homogenisation was continued for another 7 minutes.

The homogenised mixture was removed from the kneader and pressed to a thickness of 2–3 mm. in a press. 9 parts of the polypropylene mixture were then charged into a press in which the press-plates were protected 0.1 mm. thick aluminium foil. The press was closed and for 2 minutes no pressure was applied. The pressure was then increased up to a maximum of 12 tons and this pressure held for 6 minutes, the temperature being 260° C. The pressure was released and the material (0.3 mm. thick) was cooled under running water.

This material was cut into 3–5 pieces of 35 x 35 mm. section and re-charged to the press. The press was closed and no pressure was applied for 2 minutes. Over another 2 minutes the pressure was increased to 8 tons, the press temperature being 260° C. This pressure was maintained for 2 minutes and then the pressure released.

The 0.1 mm. thick polypropylene foil was then removed and tempered immediately in a circulating-air oven maintained at 150° C.

A section measuring 44 x 100 mm. was separated from the 0.1 mm. tempered polypropylene foil and exposed to light irradiation in a fademeter device consisting of a circular bank of 28 alternate sunlight and blacklight lamps. The sunlight lamps were 2 feet long, 20-watt fluorescent lamps characterised by a peak emission of 3,000 Angstrom units; the blacklight lamps were 2 feet long, 40-watt ultraviolet lamps characterised by a peak emission of 3,500 Angstrom units. The sample was rotated concentrically about the bank of lamps so that the radiation therefrom was uniformly distributed over the section under test.

The exposed sample was examined periodically and the time at which the sample reached 50% of the initial elongation at break was noted.

Similar tests were carried out using polypropylene samples containing, respectively, no stabiliser and a known stabiliser that is 2-(2'-hydroxy-3',5'-di-t-butyl-phenyl)-5-chloro-benzotriazole. The results obtained are set out in the following table

| Additive: | Time to 50% of initial elongation at break (hours) |
|---|---|
| None | 125 |
| 2-(2' - hydroxy-3',5'-di-t-butylphenyl)-5-chloro-benzotriazole | 770 |
| Example 4.—2,2,7,7,-tetramethylhexahydro-5H-1,4-diazepine-5-one | 830 |

What we claim is:

1. A composition of matter stabilized against ultraviolet deterioration which comprises polymeric material containing from 0.005% to 5% by weight of a compound having the formula

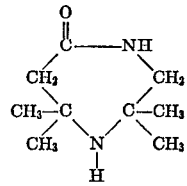

2. A composition as claimed in claim 2, wherein the polymeric material is a polyolefine.

3. A composition as claimed in claim 2, wherein the polyolefine is low- or high-density polyethylene or polypropylene.

4. A composition as claimed in claim 1, wherein the polymeric material is polystyrene.

References Cited
UNITED STATES PATENTS

| 3,577,343 | 5/1971 | Peterli et al. | 260—45.8 |
| 3,475,412 | 10/1969 | Peterli et al. | 260—45.8 |
| 3,144,440 | 8/1964 | Schindler et al. | 252—401 |
| 3,497,512 | 2/1970 | Hofer et al. | 260—45.8 |
| 3,040,029 | 6/1962 | Poppelsdorf et al. | 260—239.3 R |

FOREIGN PATENTS

| 4,512,233 | 4/1970 | Japan | 260—45.8 |

DONALD E. CZAJA, Primary Examiner

E. C. RZUCIDLO, Assistant Examiner

U.S. Cl. X.R.

252—401